US009994261B1

(12) United States Patent
Shapka (10) Patent No.: US 9,994,261 B1
(45) Date of Patent: Jun. 12, 2018

(54) SLIDING TIRE-CHAIN HANGER SYSTEM AND METHOD

(71) Applicant: Todd Wayne Shapka, Red Deer (CA)

(72) Inventor: Todd Wayne Shapka, Red Deer (CA)

( * ) Notice: Subject to any disclaimer, the term of this patent is extended or adjusted under 35 U.S.C. 154(b) by 0 days. days.

(21) Appl. No.: 15/687,408

(22) Filed: Aug. 25, 2017

(51) Int. Cl.
*B62D 25/18* (2006.01)
*B60C 27/00* (2006.01)
*B60R 11/06* (2006.01)

(52) U.S. Cl.
CPC ............ *B62D 25/184* (2013.01); *B60C 27/00* (2013.01); *B60R 11/06* (2013.01); *B62D 25/188* (2013.01)

(58) Field of Classification Search
CPC ......... B60C 27/00; B60P 3/04; B62D 25/184; B62D 25/188; B68C 1/002; B60R 11/06
USPC ............... 224/281, 42.31, 554, 564
See application file for complete search history.

(56) References Cited

U.S. PATENT DOCUMENTS

| 956,696 | A | * | 5/1910 | Frost | A47G 25/746 211/85.3 |
| 3,294,267 | A | * | 12/1966 | Schweigert | B60P 3/04 211/162 |
| 3,811,574 | A | * | 5/1974 | O'Brien | B60P 3/04 211/85.11 |
| 4,248,399 | A | | 2/1981 | Gipson | |
| 5,316,191 | A | | 5/1994 | Gibson | |
| 5,338,146 | A | * | 8/1994 | Hindt | B60P 3/12 224/282 |
| 6,371,344 | B1 | * | 4/2002 | Gros | B60C 27/00 220/324 |
| 6,955,270 | B2 | * | 10/2005 | Lay | A47B 46/00 211/85.11 |
| 2004/0074856 | A1 | | 4/2004 | Gros | |

FOREIGN PATENT DOCUMENTS

JP 2008184151 8/2008

* cited by examiner

*Primary Examiner* — Corey Skurdal
(74) *Attorney, Agent, or Firm* — Integrity Patent Group, PLC; Edwin Wold (57) ABSTRACT

A tire-chain hanger system includes a bracket, at least one track-support member, at least one chain-support member and a roller assembly including at least two support-brackets and at least one bearing. The A tire-chain hanger system is useful for providing a sliding tire-chain hanger system for improved tire-chain removal and installation.

20 Claims, 5 Drawing Sheets

SLIDING TIRE-CHAIN HANGER SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of vehicle accessories and more specifically relates to a tire-chain hanger system for a truck.

2. Description of Related Art

In many parts of the country and the world, winter driving requires the use of snow chains on tires in order to provide traction on icy and snow-packed roads. When a road is covered with snow, vehicle tires run an increased risk of skidding or losing traction. This is particularly true for large tractor-trailer trucks which are required by law in many jurisdictions to utilize snow chains during hazardous winter driving conditions. Such snow chains are often difficult to secure to truck tires, particularly in cold and icy conditions.

The ability to install and remove tire chains quickly and easily enables the user to remove them as soon as the vehicle reaches bare pavement, knowing that the tire chains can be readily re-installed as soon as (or if) they are needed again. Theoretically, perfect solutions to the installation problems and removal problems would eliminate nearly all of the operating problems.

U.S. Pat. No. 5,316,191 to C. Norman Gibson relates to a tire chain hanger support assembly. The described tire chain hanger support assembly includes a tire chain hanger support assembly connectable to a support frame of a vehicle and having 1) a main support frame assembly secured to the support frame; 2) a chain support frame assembly telescopingly mounted on the main support frame assembly; 3) a telescoping control assembly to limit axial outer lateral movement of the chain support frame assembly; and 4) a mud flap support assembly connected to the chain support frame assembly. The chain support frame assembly is selectively operable to be moved outwardly laterally of the support frame and includes a chain support assembly to receive and convey tire chains. The chain support assembly is movable to a stored condition and held in a locked condition by the telescoping control assembly. The mud flap assembly includes a forward flap assembly connected to the chain support frame assembly and a rear flap assembly operable to be connected to the support frame. The mud flap assembly provides protection to the stored tire chains from mud, snow, and debris from rotating vehicle tire members.

BRIEF SUMMARY OF THE INVENTION

In view of the foregoing disadvantages inherent in the known vehicle accessories art, the present disclosure provides a novel sliding tire-chain hanger system and method. The general purpose of the present disclosure, which will be described subsequently in greater detail, is to provide a sliding tire-chain hanger system for improved tire-chain removal and installation.

A tire-chain hanger system is disclosed herein. The tire-chain hanger system may include a bracket configured for installation on a vehicle-frame; at least one track-support member including a first horizontal-axis, a top-surface, a bottom-surface, a first distal-end and a first-proximal end relative the vehicle-frame. The first proximal-end may be fixedly attached to the bracket and the first distal-end may include a movement-stopper.

Further, the tire-chain hanger system may include at least one chain-support member including a second horizontal-axis, a second distal-end and a second proximal-end relative the vehicle-frame. The second proximal-end may include a chain-securement means, and the at least one chain-support member may be configured to support the tire-chain thereon.

In addition, the tire-chain hanger system may include a roller assembly including at least two support-brackets located opposite each other fixedly attached to the second distal-end of the at least one chain-support member and functioning to attach the at least one chain-support member to the at least one track-support member; and at least one bearing fixedly-attached between the at least two support-brackets and contacting the top-surface of the at least one track-support member. The at least one bearing may be configured to roll the chain-support member along the first horizontal-axis between a closed-position and an open-position, and the open-position of the tire-chain hanger system may permit ready access to the tire-chain supported on the chain-support member.

A method of using the tire-chain hanger system is also disclosed herein. The method of using tire-chain hanger system may comprise the steps of: providing the tire-chain hanger system as above; installing the tire-chain hanger system onto the vehicle-frame via the bracket; rolling the at least one chain-support member along the first horizontal-axis from the closed-position to the open-position; removing the tire-chain from the at least one chain-support member; rolling the at least one chain-support member along the first horizontal-axis from the open-position to the closed position; and using the tire-chain on a tire.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a sliding tire-chain hanger system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to vehicle accessories and more particularly to a sliding tire-chain hanger system and method as used to improve the tire-chain hanger system for a truck.

Generally, the tire chain hanger system may roll on bearings and may be very compact and safe. The system may be configured to hang the tire-chains. The bearings may roll the tire-chains out for easy access to easily install and remove the tire-chains from the system. The tire chain hanger system may be compact and universal to fit on all truck frames.

Referring now more specifically to the drawings by numerals of reference, there is shown in FIGS. 1-5, various views of a tire-chain hanger system ("system" 100). The system 100 may be used for installation on a vehicle 5 including a vehicle-frame 10.

Figure 1:
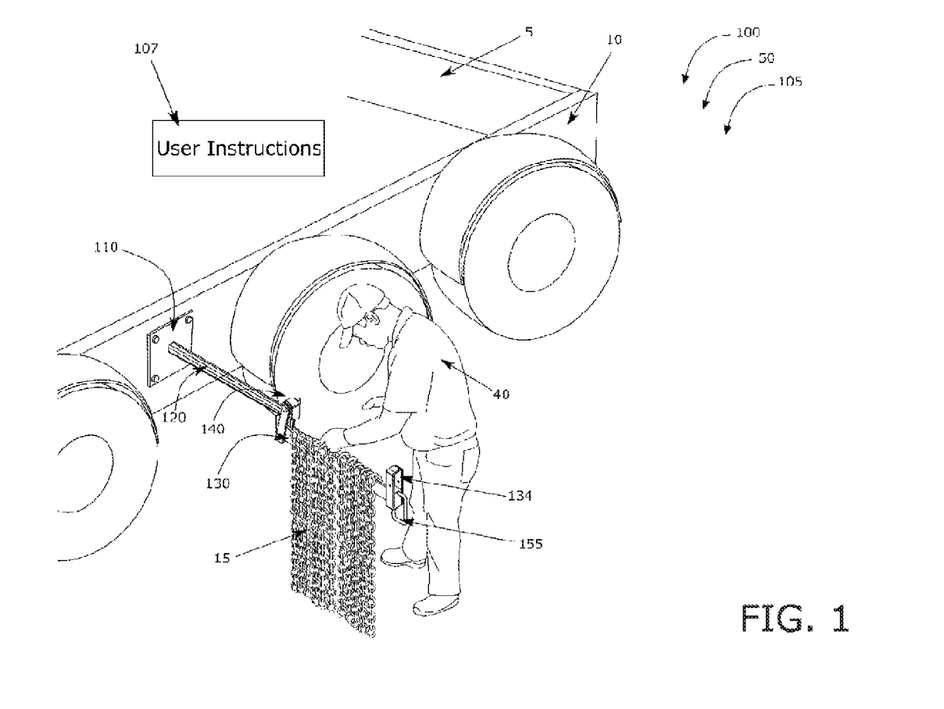
FIG. 1 is a front perspective view of the tire-chain hanger system during an 'in-use' condition, according to an embodiment of the disclosure.

FIG. 1 shows the system 100 during an 'in-use' condition 150, according to an embodiment of the present disclosure. As illustrated, the system 100 may include a bracket 110, at least one track-support member 120, at least one chain-support member 130, and a roller assembly 140 including at least two support-brackets 142 and at least one bearing 144. As shown, the bracket 110 may be configured for installation on the vehicle-frame 10. In particular, the bracket 110 may be installed in front of a double set of drive wheels. Or alternatively, the bracket 110 may be installed onto any part of the vehicle-frame 10. The bracket 110 may be bolted onto the vehicle-frame 10 via at least one bolt. Further, illustrated here is an open-position 146 of the system 100 attached to the vehicle-frame and configured to permit ready access to the tire-chain 15 supported on the chain-support member 130.

According to one embodiment, the system 100 may be arranged as a kit. The kit may include a set of instructions. The instructions may detail functional relationships in relation to the structure of the system 100 (such that system 100 can be used, maintained, or the like, in a preferred manner).

Figure 2:
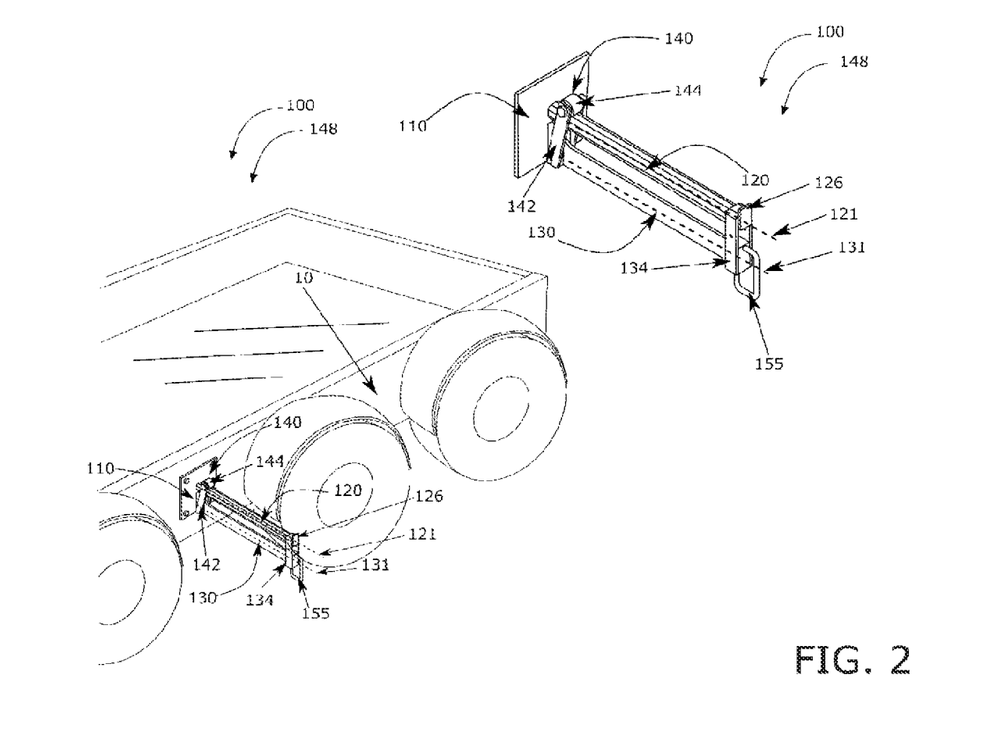
FIG. 2 is a side perspective view of the tire-chain hanger system in a closed-position, according to an embodiment of the present disclosure.

FIG. 2 shows a side perspective view of the system 100 in a closed-position 148, according to an embodiment of the present disclosure. As shown, the system 100 may include the bracket 110, the at least one track-support member 120, the at least one chain-support member 130, and the roller assembly 140 including the at least two support-brackets 142 and the at least one bearing 144.

The at least one track-support member 120 may include a first horizontal-axis 121, a top-surface 122, a bottom-surface 123, a first distal-end 124 and a first proximal-end 125 relative the vehicle-frame 10; the first proximal-end 125 being fixedly attached to the bracket 110; the first distal-end 124 including a movement-stopper 126. Similarly, the at least one chain-support member 130 may include a second horizontal-axis 131, a second distal-end 132 and a second proximal-end 133 relative the vehicle-frame 10, the second proximal-end 133 including a chain-securement means 134, and the at least one chain-support member 130 being configured to support the tire-chain 15 thereon.

Figure 3:
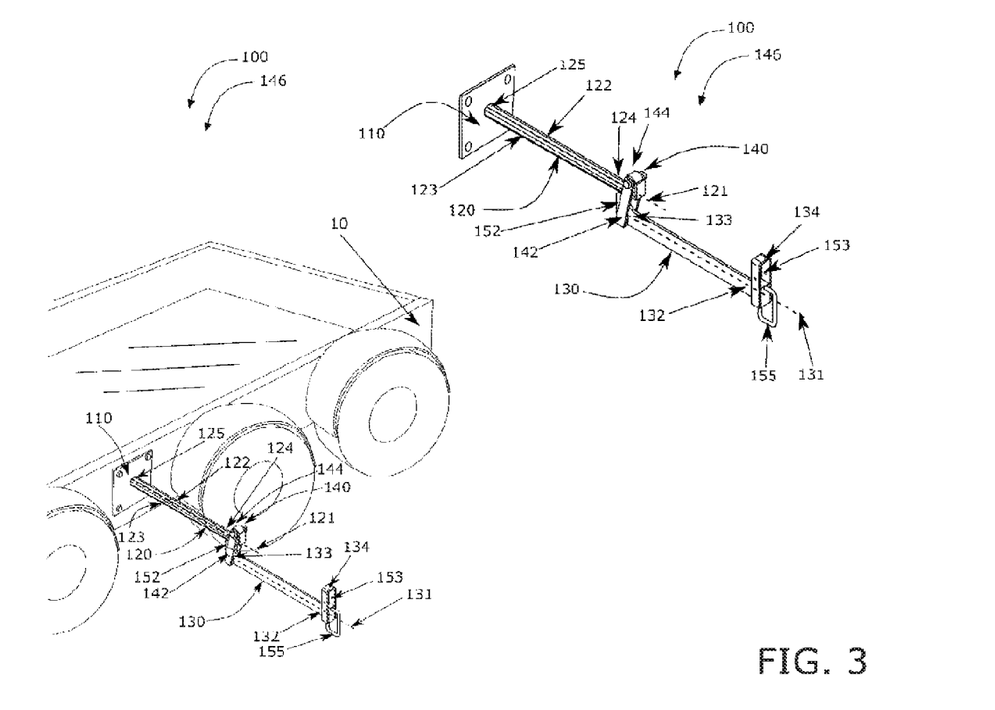
FIG. 3 is a side perspective view of the tire-chain hanger system in an open-position, according to an embodiment of the present disclosure.

As shown, the at least two support-brackets 142 may be located opposite each other, fixedly attached to the second distal-end 132 of the at least one chain-support member 130 and functioning to attach the at least one chain-support member 130 to the at least one track-support member 120. The at least one bearing 144 may be fixedly-attached between the at least two support-brackets 142 and contacting the top-surface 122 of the at least one track-support member 120; the at least one bearing 144 being configured to roll the chain-support member 130 along the first horizontal-axis 121 between a closed-position 148 and an open-position 146 (FIG. 3).

As illustrated in this figure, the closed-position 148 may include the at least one track-support-member 120 and the at least one chain-support member 130 being vertically aligned. Further, the closed-position 148 may include the first horizontal-axis 121 and the second horizontal-axis 131 being relatively parallel. The at least one track-support member 120 and the at least one chain-support member 130 may include a gap 151 therebetween which may be occupied by the tire-chain 15 when the tire-chain hanger system 100 is in the closed-position 148.

As above, the second proximal-end 133 may include the chain-securement means 134. The chain-securement means 134 may be a substantially rectangular-shaped member including an aperture 153 sized to receive the at least one track-support member 120 (as illustrated in FIG. 3). Further, the chain-securement means 134 may be configured to attach to the at least one-track support member 120 via the aperture 153 in the closed-position 148. Additionally, the movement-stopper 126 may be further configured to inhibit movement of the chain-securement means 134 from the at least one track-support member 120 when the chain-securement means 134 is attached via the aperture 153, and the tire-chain hanger system 100 is in the closed-position 148.

In another embodiment, the chain-securement means 134 may include a lock-mechanism further configured to inhibit movement of the chain-securement means 134 from the at least one track-support member 120 when the chain-securement means 134 is attached via the aperture 153, and the tire-chain hanger system 100 is in the closed-position 148. The lock-mechanism may be a clamp configured to tighten the grip of the chain-securement means 134 on the at least one track-support member 120. It is appreciated that a variety of lock-mechanisms may be used.

FIG. 3 shows a side perspective view of the system 100 in the open-position 146 according to an embodiment of the present disclosure. As above, the system 100 may include the bracket 110, the at least one track-support member 120, the at least one chain-support member 130, and the roller assembly 140 including the at least two support-brackets 142 and the at least one bearing 144. As illustrated, the second proximal-end 133 of the at least one chain-support member 130 may further include a vertical-support 152 configured to contact the bottom-surface 123 of the track-support member 120. In this embodiment, the vertical-support 152 may be further configured to aid in rolling the at least one chain-support member 130 along the first-horizontal axis of the track-support member 120. In addition, the vertical-support 152 may be configured to aid in inhibiting movement of the at least one bearing 144 when the tire-chain hanger system 100 is in the open-position 146 (along with the movement-stopper 126). In the preferred embodiment, the movement-stopper 126 may be a raised-lip configured to inhibit movement of the at least one bearing 144 when the tire-chain hanger system 100 is in the open-position 146.

The second proximal-end 133 of the at least one chain-support member 130 may further include a handle 155 fixedly attached to the chain-securement means 134. The handle 155 may assist in rolling the chain-support member along the first horizontal-axis 121 between a closed-position 148 and an open-position 146.

Figure 4A:
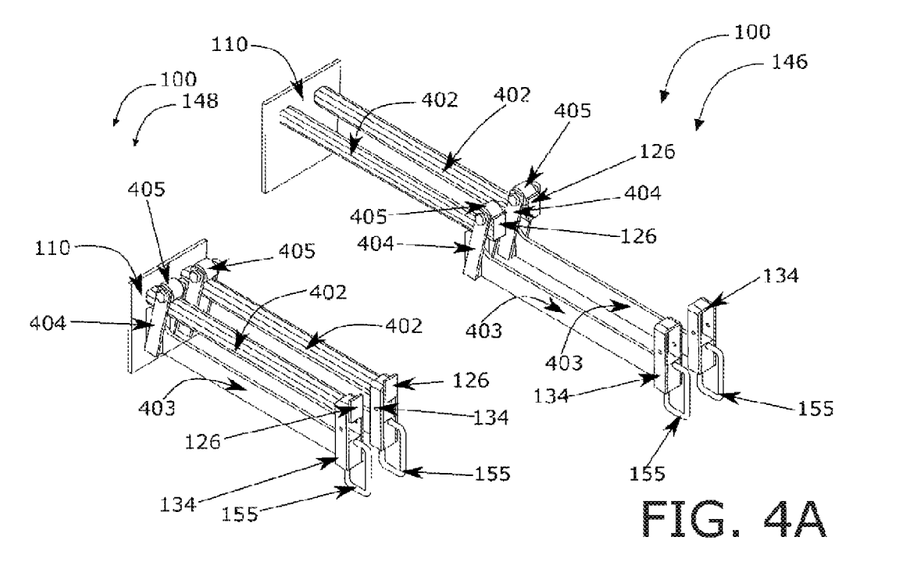
FIG. 4A is a side perspective view of the tire-chain hanger system according to an alternative embodiment of the present disclosure.

FIG. 4A shows a side perspective view of the system 100 of FIG. 1, according to an alternative embodiment of the present disclosure. As illustrated, in one embodiment the at least one track-support member 120, the at least one chain-support member 130, the at least two support-brackets 142, and the at least one bearing 144 may be two track-support members 402, two chain-support members 403, four support-brackets 404, and two bearings 405, respectively, such that two pairs of tire-chains 15 may be secured to the system 100.

Figures 4B, 4C:
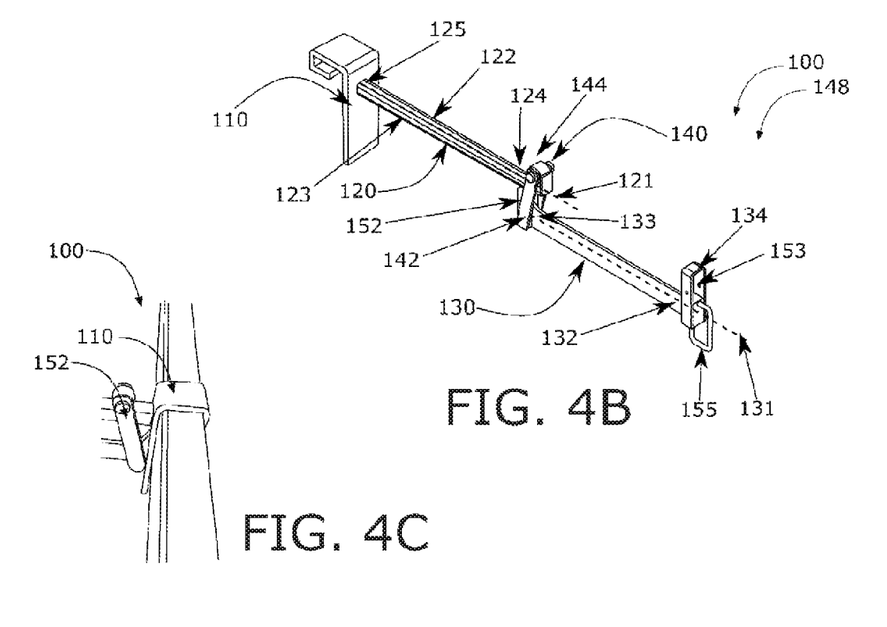
FIG. 4B is a side perspective view of the tire-chain hanger system according to an alternative embodiment of the present disclosure.
FIG. 4C is a side perspective view of the tire-chain hanger system of FIG. 4B according to an alternative embodiment of the present disclosure.

FIG. 4B shows a side perspective view of the system 100, according to an alternative embodiment of the present disclosure. As illustrated, the bracket 110 may be a wrap-around U-shaped apparatus that may slide over the vehicle-frame 10 and bolt in to place. However, it should be appreciated that other securement means may be used to install the bracket 110 onto the vehicle-frame 10. The bracket 110 may be installed onto any part of the vehicle-frame 10. Further, the wrap-around U-shaped apparatus may be easily moveable.

FIG. 4C shows a side perspective view of the system 100, according to an alternative embodiment of the present disclosure and illustrating a close-up view of the bracket 110 of FIG. 4B. Here, the bracket 110 is shown wrapped around the vehicle-frame 10.

Figure 5:
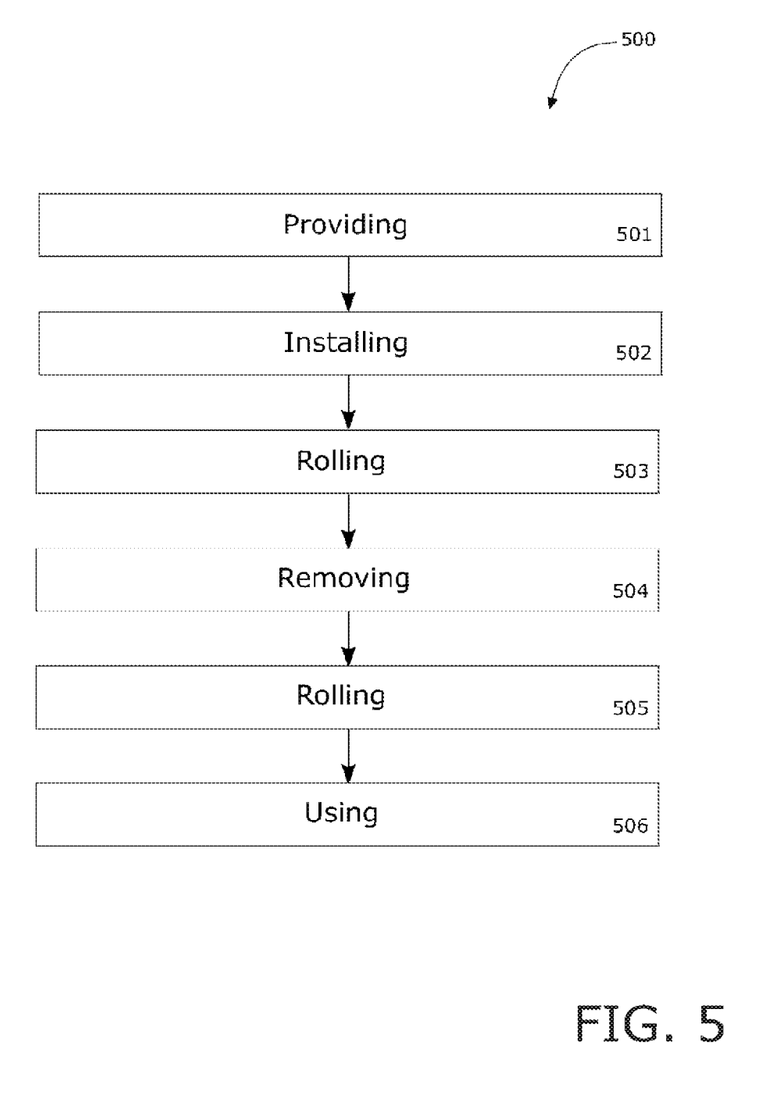
FIG. 5 is a flow diagram illustrating a method of use for the tire-chain hanger system, according to an embodiment of the present disclosure.

FIG. 5 is a flow diagram 550 illustrating a method of using a tire-chain hanger system 500, according to an embodiment of the present disclosure. As illustrated, the method of using a tire-chain hanger system 500 may include the steps of: step one 501, providing the system 100 as above; step two 502, installing the system onto the vehicle-frame 10 via the bracket 110; step three 503, rolling the at least one chain-support member 130 along the first horizontal-axis 121 from the closed-position 148 to the open-position 146; step four 504, removing the tire-chain 15 from the at least one chain-support member 130; step five 505, rolling the at least one chain-support member 130 along the first horizontal-axis 121 from the open-position 146 to the closed position; and step six 506, using the tire-chain 15 on a tire.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the above system 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A tire-chain hanger system for installation on a vehicle, the vehicle including a vehicle-frame, the tire-chain hanger system comprising:
    a bracket, the bracket being configured for installation on the vehicle-frame;
    at least one track-support member, the at least one track-support member including a first horizontal-axis, a top-surface, a bottom-surface, a first distal-end and a first proximal-end relative the vehicle-frame, the first proximal-end being fixedly attached to the bracket, the first distal-end including a movement-stopper;
    at least one chain-support member, the at least one chain-support member including a second horizontal-axis, a second distal-end and a second proximal-end relative the vehicle-frame, the second proximal-end including a chain-securement means, the at least one chain-support member being configured to support the tire-chain thereon; and
    a roller assembly including:
        at least two support-brackets located opposite each other, the at least two support-brackets fixedly attached to the second distal-end of the at least one chain-support member and functioning to attach the at least one chain-support member to the at least one track-support member; and
        at least one bearing, the at least one bearing fixedly-attached between the at least two support-brackets and contacting the top-surface of the at least one track-support member, the at least one bearing being configured to roll the chain-support member along the first horizontal-axis between a closed-position and an open-position; and
    wherein the open-position of the tire-chain hanger system permits ready access to the tire-chain supported on the chain-support member.

2. The tire-chain hanger system of claim 1, wherein the closed-position includes the at least one-track support member and the at least one chain-support member being vertically aligned.

3. The tire-chain hanger system of claim 2, wherein the closed-position includes the first horizontal-axis and the second horizontal-axis being relatively parallel.

4. The tire-chain hanger system of claim 1, wherein the at least one-track support member and the at least one-chain support member include a gap therebetween.

5. The tire-chain hanger system of claim 4, wherein the gap is occupied by the tire-chain when the tire-chain hanger system is in the closed-position.

6. The tire-chain hanger system of claim 1, wherein the movement-stopper is a raised-lip configured to inhibit movement of the at least one bearing when the tire-chain hanger system is in the open-position.

7. The tire-chain hanger system of claim 1, wherein the second-proximal end includes a vertical-support configured to contact the bottom-side of the track-support member.

8. The tire-chain hanger system of claim 7, wherein the vertical-support is further configured to aid in rolling the chain-support member along the first-horizontal axis of the track-support member.

9. The tire-chain hanger system of claim 8, wherein the vertical-support is further configured to aid in inhibiting movement of the at least one bearing when the tire-chain hanger system is in the open-position.

10. The tire-chain hanger system of claim 1, wherein the chain-securement means is a substantially rectangular-shaped member including an aperture.

11. The tire-chain hanger system of claim 10, wherein the aperture is sized to receive the at least one track-support member.

12. The tire-chain hanger system of claim 11, wherein the chain-securement means is configured to attach to the at least one-track support member via the aperture in the closed-position.

13. The tire-chain hanger system of claim 12, wherein the movement-stopper is further configured to inhibit movement of the chain-securement means from the at least one-track support member when the chain-securement means is attached via the aperture, and the tire-chain hanger system is in the closed-position.

14. The tire-chain hanger system of claim 13, wherein the chain-securement means includes a lock-mechanism further configured to inhibit movement of the chain-securement means from the at least one track-support member when the chain-securement means is attached via the aperture, and the tire-chain hanger system is in the closed-position.

15. The tire-chain hanger system of claim 1, wherein the second proximal-end further includes a handle.

16. The tire-chain hanger system of claim 15, wherein the handle is fixedly attached to the chain-securement means.

17. The tire-chain hanger system of claim 1, wherein the at least one track-support member, the at least one chain-support member, the at least two support-brackets, and the at least one bearing are two track-support members, two chain-support members, four support-brackets, and two bearings, respectively.

18. A tire-chain hanger system for installation on a vehicle, the vehicle including a vehicle-frame, the tire-chain hanger system comprising:
  a bracket, the bracket being configured for installation on the vehicle-frame;
  at least one track-support member, the at least one track-support member including a first horizontal-axis, a top-surface, a bottom-surface, a first distal-end and a first proximal-end relative the vehicle-frame, the first proximal-end being fixedly attached to the bracket, the first distal-end including a movement-stopper;
  at least one chain-support member, the at least one chain-support member including a second horizontal-axis, a second distal-end and a second proximal-end relative the vehicle-frame, the second proximal-end including a chain-securement means, the at least one chain-support member being configured to support the tire-chain thereon; and
  a roller assembly including:
    at least two support-brackets located opposite each other, the at least two support-brackets fixedly attached to the second distal-end of the at least one chain-support member and functioning to attach the at least one chain-support member to the at least one track-support member; and
    at least one bearing, the at least one bearing fixedly-attached between the at least two support-brackets and contacting the top-surface of the at least one track-support member, the at least one bearing being configured to roll the chain-support member along the first horizontal-axis between a closed-position and an open-position; and
  wherein the open-position of the tire-chain hanger system permits ready access to the tire-chain supported on the chain-support member; and
  wherein the closed-position includes the at least one-track support member and the at least one chain-support member being vertically aligned;
  wherein the closed-position includes the first horizontal-axis and the second horizontal-axis being relatively parallel;
  wherein the at least one-track support member and the at least one-chain support member include a gap therebetween;
  wherein the gap is occupied by the tire-chain when the tire-chain hanger system is in the closed-position;
  wherein the movement-stopper is a raised-lip configured to inhibit movement of the at least one bearing when the tire-chain hanger system is in the open-position;
  wherein the second-proximal end includes a vertical-support configured to contact the bottom-side of the track-support member;
  wherein the vertical-support is further configured to aid in rolling the chain-support member along the first-horizontal axis of the track-support member,
  wherein the vertical-support is further configured to aid in inhibiting movement of the at least one bearing when the tire-chain hanger system is in the open-position;
  wherein the chain-securement means is a substantially rectangular-shaped member including an aperture;
  wherein the aperture is sized to receive the at least one track-support member,
  wherein the chain-securement means is configured to attach to the at least one-track support member via the aperture in the closed-position;
  wherein the movement-stopper is further configured to inhibit movement of the chain-securement means from the at least one-track support member when the chain-securement means is attached via the aperture, and the tire-chain hanger system is in the closed-position;
  wherein the chain-securement means includes a lock-mechanism further configured to inhibit movement of the chain-securement means from the at least one track-support member when the chain-securement means is attached via the aperture, and the tire-chain hanger system is in the closed-position;
  wherein the second proximal-end further includes a handle;
  wherein the handle is fixedly attached to the chain-securement means; and
  wherein the at least one track-support member, the at least one chain-support member, the at least two support-brackets, and the at least one bearing are two track-support members, two chain-support members, four support-brackets, and two bearings, respectively.

19. The tire-chain hanger system of claim 17, further comprising set of instructions; and
wherein the tire-chain hanger system is arranged as a kit.

20. A method of using a tire-chain hanger system, the method comprising the steps of:
providing a tire-chain hanger system including:
a bracket, the bracket configured for installation on a vehicle-frame;
at least one track-support member, the at least one track-support member including a first horizontal-axis, a top-surface, a bottom-surface, a first distal-end and a first proximal-end relative the vehicle-frame, the first proximal-end being fixedly attached to the bracket, the first distal-end including a movement-stopper;
at least one chain-support member, the at least one chain-support member including a second horizontal-axis, a second distal-end and a second proximal-end relative the vehicle-frame, the second proximal-end including a chain-securement means, the at least one chain-support member being configured to support the tire-chain thereon; and
a roller assembly including:
at least two support-brackets located opposite each other, the at least two support-brackets fixedly attached to the second distal-end of the at least one chain-support member and functioning to attach the at least one chain-support member to the at least one track-support member; and
at least one bearing, the at least one bearing fixedly-attached between the at least two support-brackets and contacting the top-surface of the at least one track-support member, the at least one bearing being configured to roll the chain-support member along the first horizontal-axis between a closed-position and an open-position;
installing the tire-chain hanger system onto the vehicle-frame via the bracket;
rolling the at least one chain-support member along the first horizontal-axis from the closed-position to the open-position;
removing the tire-chain from the at least one chain-support member;
rolling the at least one chain-support member along the first horizontal-axis from the open-position to the closed position; and
using the tire-chain on a tire.

* * * * *